(12) United States Patent
Fergason

(10) Patent No.: US 9,244,279 B1
(45) Date of Patent: Jan. 26, 2016

(54) GLASSES-TYPE AUGMENTED REALITY DISPLAY SYSTEM

(71) Applicant: Fergason Patent Properties LLC, Menlo Park, CA (US)

(72) Inventor: John D. Fergason, Los Altos, CA (US)

(73) Assignee: Fergason Licensing LLC, Portola Valley, CA (US)

( * ) Notice: Subject to any disclaimer, the term of this patent is extended or adjusted under 35 U.S.C. 154(b) by 0 days.

(21) Appl. No.: 14/210,651

(22) Filed: Mar. 14, 2014

Related U.S. Application Data

(60) Provisional application No. 61/789,282, filed on Mar. 15, 2013.

(51) Int. Cl.
*G02B 27/14* (2006.01)
*G02B 27/01* (2006.01)
*G02B 17/08* (2006.01)

(52) U.S. Cl.
CPC ........ *G02B 27/0172* (2013.01); *G02B 17/0856* (2013.01)

(58) Field of Classification Search
CPC ........... G02B 27/0101; G02B 27/0172; G02B 17/0856
USPC ................ 359/630–634, 727, 13; 353/13, 28; 349/11; 427/164
See application file for complete search history.

(56) References Cited

U.S. PATENT DOCUMENTS

| | | | |
|---|---|---|---|
| 6,612,697 B1 * | 9/2003 | Aurelius et al. | 351/159.62 |
| 8,384,999 B1 * | 2/2013 | Crosby et al. | 359/631 |
| 2014/0211146 A1 * | 7/2014 | Gupta et al. | 351/158 |

* cited by examiner

*Primary Examiner* — Tuyen Tra
(74) *Attorney, Agent, or Firm* — Vedder Price P.C.

(57) ABSTRACT

A lens including a first portion having a recess of a defined shape, a second portion having a shaped feature shaped such that the recess accommodates the shaped feature when the first portion is adhered to the second portion, a reflective thin film applied to a surface of the shaped feature. A pair of glasses-type augmented reality display incorporates said lenses.

24 Claims, 4 Drawing Sheets

GLASSES-TYPE AUGMENTED REALITY DISPLAY SYSTEM

CROSS-REFERENCE TO RELATED APPLICATION

This application is a non-provisional of U.S. provisional patent application No. 61/789,282, filed Mar. 15, 2013, .

BACKGROUND OF THE INVENTION

1. Field of The Invention

Embodiments of the present invention relate to an augmented reality display system.

2. Background

The function of an augmented reality (AR) display system is to overlay imagery on the user's view of the environment. There are a variety of hardware configurations in use or proposed for such a system. Quite often, the AR system is head-mounted, the user required to wear a helmet or some form of glasses. One of the challenges in designing a glasses-type AR display system is to make the hardware both physically light and compact. At the same time, the system must not overly intrude into the user's view of the environment. During the past few years, perhaps the highest profile example of such a system is the "Google Glasses."

One common approach to the design of a glasses-type AR system uses a projector to produce the image. The projected image must then be directed to the user's eye. There are a variety of approaches by which this could be accomplished. An approach to redirecting the image used in several products or otherwise reported in the literature makes use of a full or semi-transparent mirror on the surface of at least one lens of the glasses.

There are several problems with this approach. The first is that a mirror fully blocks the user's view of the environment behind the mirror. Although somewhat of an improvement, a semi-transparent mirror will also significantly alter the user's view of the environment when looking through the semi-transparent mirror.

Perhaps of greater consequence is the fact that the mirror must be properly oriented and shaped to correctly reflect a focused image to the user's eye. It follows that, since the mirror is on the surface of the lens, the orientation and shape of the corresponding lens surface is dictated by the requirements of the mirror. This is illustrated in FIG. 1.

The "distortion" in the shape of the lens can, in turn, result in an AR system that causes a very undesired region of distortion in the user's view of the environment.

The invention described in this disclosure consists of a combination of device configurations and associated reflector material. The use of the invention is in a glasses-type AR system and serves the purpose of redirecting the projected image to the eye of the user. It does so in a way that is at least equivalent in weight and compactness to approaches, but is less obtrusive.

BRIEF SUMMARY OF THE INVENTION

Accordingly, the present invention is directed to glasses-type augmented reality display system that obviates one or more of the problems due to limitations and disadvantages of the related art.

An advantage of the present invention is to provide augmented reality glasses where an image is projected in a wide range of ways without meaningfully interfering with a user's view of the environment.

Additional features and advantages of the invention will he set forth in the description which follows, and in part will be apparent from the description, or may be learned by practice of the invention. These and other advantages of the invention will be realized and attained by the structure particularly pointed out in the written description and claims hereof as well as the appended drawings.

To achieve these and other advantages and in accordance with the purpose of the present invention, as embodied and broadly described, in one embodiment, the improved glasses-type augmented reality display system includes a first portion having a recess of a defined shape, a second portion having a shaped feature shaped such that the recess accommodates the shaped feature when the first portion is adhered to the second portion, and a reflective layer on a surface of the shaped feature.

In another aspect of the present invention, the reflective layer reflects a portion of the visible spectrum.

In another aspect of the present invention, the first portion is sealed to the second portion using an optical cement.

In another aspect of the present invention, the shaped feature is shaped such that light projected onto the reflective layer is reflected to a predetermined point outside the lens.

In another aspect of the present invention, the first portion is substantially concave and the second portion is substantially convex.

In another aspect of the present invention, the shaped feature is coated in a plurality of reflective thin films with each reflective thin film configured to reflect a different portion of the visible spectrum of light.

In another aspect of the present invention, at least one of the reflective thin films reflects light in the range of 620-750 nm.

In another aspect of the present invention, at least one of the reflective thin films reflects light in the range of 450-495 nm.

In another aspect of the present invention, at least one of the reflective thin films reflects light in the range of 495-570 nm.

In another embodiment, the improved glasses-type augmented reality display system includes a pair of augmented reality glasses including a frame, a lens in the frame, the lens including a first portion having a recess of a defined shape, a second portion having a shaped feature shaped such that the recess accommodates the shaped feature when the first portion abuts the second portion, a reflective layer on a surface of the shaped feature, and a projector affixed to the frame near the lens.

In another aspect of the present invention, the reflective layer reflects a portion of the visible spectrum.

In another aspect of the present invention, the first portion is sealed to the second portion using an optical cement.

In another aspect of the present invention, the shaped feature is shaped such that light projected onto the reflective layer is reflected to a predetermined point outside the lens.

In another aspect of the present invention, the first portion is substantially concave and the second portion is substantially convex.

In another aspect of the present invention, the shaped feature is coated in a plurality of reflective thin films with each reflective thin film configured to reflect a different portion of the visible spectrum of light.

In another aspect of the present invention, at least one of the reflective thin films reflects light in the range of 620-750 nm.

In another aspect of the present invention, at least one of the reflective thin films reflects light in the range of 450-495 nm.

In another aspect of the present invention, at least one of the reflective thin films reflects light in the range of 495-570 nm.

In another embodiment, the improved glasses-type augmented reality display system includes a method of forming a lens including the steps of forming a first portion, forming a recess having a defined shape in the first portion, forming a second portion, forming a shaped feature corresponding to the recess on the first portion on a surface of the surface of the second portion, and forming a reflective thin film on the surface of the shaped feature.

In another embodiment, the improved glasses-type augmented reality display system includes the thin film reflects a portion of the visible spectrum.

In another embodiment, method includes the step of sealing the first portion to the second portion using an optical cement.

In another embodiment, method includes the step of shaping the shaped feature such that light projected onto the reflective thin film is reflected to a predetermined point outside the lens.

In another embodiment, the first portion is substantially concave and the second portion is substantially convex.

In another embodiment, the coating step includes the step of coating the shaped feature with a plurality of reflective thin films with each reflective thin film configured to reflect a different portion of the visible spectrum of light.

In another embodiment, at least one of the reflective thin films reflects light in the range of 620-750 nm.

In another embodiment, at least one of the reflective thin films reflects light in the range of 450-495 nm.

In another embodiment, at least one of the reflective thin films reflects light in the range of 495-570 nm. Further embodiments, features, and advantages of the improved glasses type AR system, as well as the structure and operation of the various embodiments of the AR system, are described in detail below with reference to the accompanying drawings.

It is to be understood that both the foregoing general description and the following detailed description are exemplary and explanatory only, and are not restrictive of the invention as claimed.

BRIEF DESCRIPTION OF THE DRAWINGS

The accompanying figures, which are incorporated herein and form part of the specification, illustrate a glasses-type augmented reality display system. Together with the description, the figures further serve to explain the principles of the glasses-type augmented reality display system described herein and thereby enable a person skilled in the pertinent art to make and use the glasses-type augmented reality display system.

DETAILED DESCRIPTION OF THE INVENTION

Figure 1:
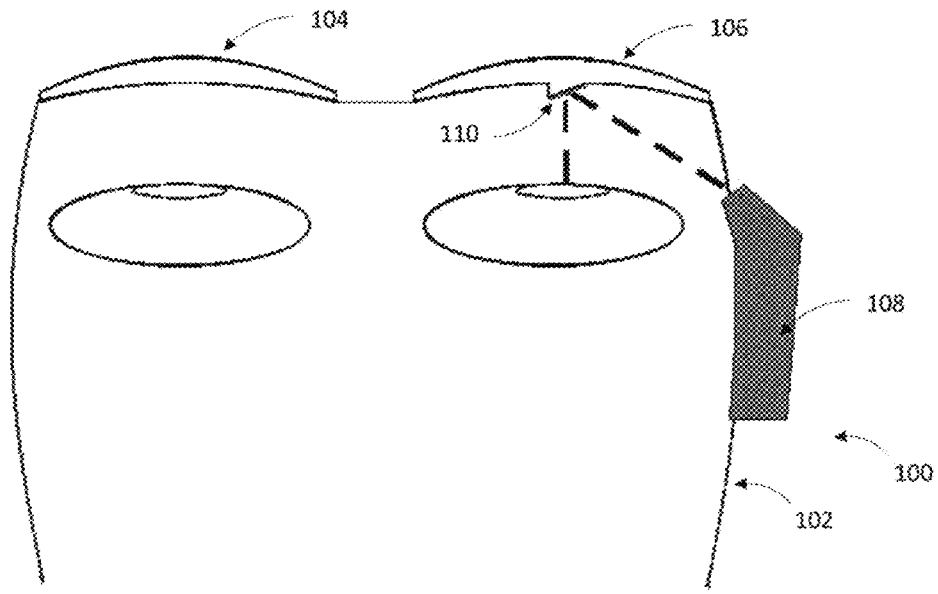
FIG. 1 is top view of an augmented reality display system.

Reference will now be made in detail to embodiments of the improved glasses type AR system with reference to the accompanying figures, in which like reference numerals indicate like elements.

It will be apparent to those skilled in the art that various modifications and variations can he made in the present invention without departing from the spirit or scope of the invention. Thus, it is intended that the present invention cover the modifications and variations of this invention provided they come within the scope of the appended claims and their equivalents.

One of the challenges in designing a glasses-type Augmented Reality (AR) display system is to make the hardware both physically light and compact. At the same time, the system must not overly intrude into the user's view of the environment. The inventions in this disclosure address these issues by embedding a wavelength specific reflective "optical element" into at least one lens of the glasses. This optical element can he further described as a shaped, reflective thin film. In conjunction with a "projector" having a limited emissive wavelength also located within the glasses, the "optical element" serves to reflect the focused, projected image into the eye of the user. The user's view of the environment is unimpeded through the projected image at wavelengths other than that utilized by the projector and elsewhere within the field of view were the image is not projected.

FIG. 1 discloses a top view AR display system. The AR system includes glasses 100 having a frame 102, a left lens 104 and a right lens 106. A projector 108 is affixed to the frame 102 on the side of the frame 102 closest the right lens 106. The projector 108 is configured to project an image onto a mirror 110 affixed to a portion of the right lens 106. The mirror 110 is positioned on the right lens 106 such that an image projected from the projector 108 is reflected onto the eye of a user wearing the glasses 100. The mirror 110 is affixed on a side of the right lens 106 closest to the eye of a user. The mirror 110 is affixed at an angle with respect to the back surface of the right lens 106 such that one end of the mirror 110 extends towards the eye of the user. The mirror angle is adjusted to reflect light from the projector into the user's eye.

Figure 2:
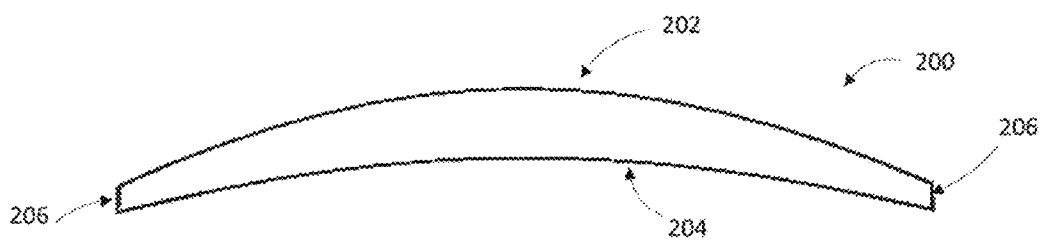
FIG. 2 illustrates a single component lens.

FIG. 2 discloses a single component lens. The lens 200 includes a front surface 202, a back surface 204 and side surfaces 206. The lens may be a concave lens or a convex lens. The lens may be made from any translucent or semi-translucent material including, but not limited to glass, clear acrylic, clear plastic or any other translucent or semi-translucent rigid material. The shape of the lens 200 is formed such that light passing through the lens 200 is focused to a point on the side of the lens 200 furthest from the light source.

Figure 3A:
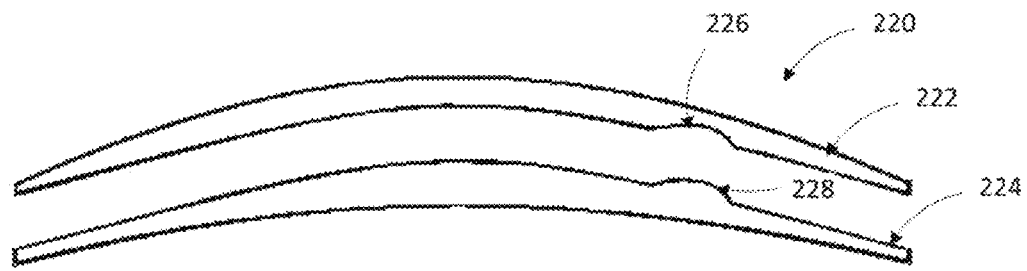
FIG. 3A illustrates a two section lens.

FIG. 3A discloses a two section lens 220. The two section lens 220 includes a first portion 222 and a second portion 224 that is optically equivalent to the lens of FIG. 2 when the first portion 222 and second portion 224 are combined. The first portion 222 and second portion 224 are shaped such that the facing surfaces of the first portion 222 and second portion 224 accommodate one another to form a structure substantially identical to the lens of FIG. 2 when the two portions abut one another. In one embodiment, the first portion 222 includes a convex side that accommodates a concave side of the second portion 224. The first portion 222 includes a recess 226 and the second portion 224 includes a corresponding shaped feature 228 that is firmed in a shape complementary to the recess 226 such that the shaped feature 228 fills the recess 226 when the first portion 222 and second portion 224 of the two section lens abut one another or are pressed together. The shaped feature 228 may have a substantially concave shape and the recess 226 may have a substantially convex shape that accommodates the shaped feature 228. The shaped feature 228 may be molded, grounded or cut or formed by any suitable means. For example, in one embodiment, the shaped feature 228 is molded into the second portion 224. In another embodiment, the shaped feature 228 may be an integral part of the optical design of the AR system.

Figure 3B:
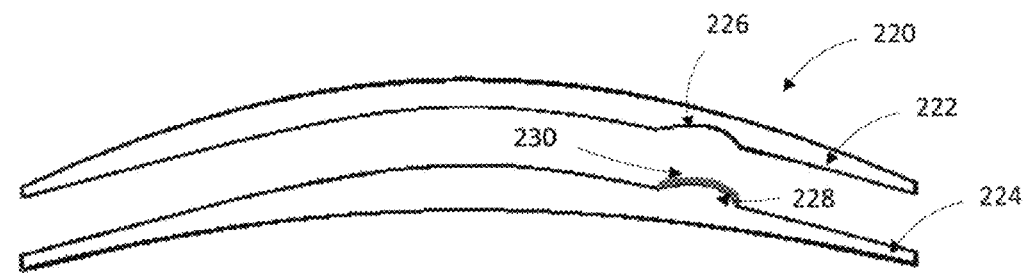
FIG. 3B illustrates the two sectional lens of FIG. 3A with a reflective thin film coating the shaped feature.

FIG. 3B discloses the two sectional lens 220 of FIG. 3A with a reflective thin layer 230 on the shaped feature 228. The reflective layer 230 may be a reflective thin film that is transparent or translucent and may have an optical property of reflecting a limited portion of the visible spectrum while transmitting the balance of the visible spectrum. The portion of the visible spectrum reflected by the thin film corresponds to the limited spectra of the light produced by the projector 108. The thin film 230 may be any material capable of reflecting a limited, portion of the visible spectrum.

In one embodiment the emission of the projector 108, rather than being restricted to one narrow wavelength band and shaped feature 228 and thin film 230 being restricted to a single corresponding narrow wavelength band, the system may utilize multiple narrow wavelength bands. As an illustrative example the projector may emit narrow wavelengths in the red, green and blue and the shaped feature 228 may include multiple thin films 230 that each reflect a corresponding red, green or blue portion of the spectrum. In this way, it becomes possible to produce images in color. It can be noted that the lens disclosed in this document is compatible with the inclusion of a prescription function on either or both surfaces of the lens. Consistent with this embodiment, one reflective thin film may reflect light in the range of 620-750 nm, a second reflective thin film may reflect light in the range of 450-495 nm, and a third reflective thin film may reflect light in the range of 495-570 nm.

Figure 3C:
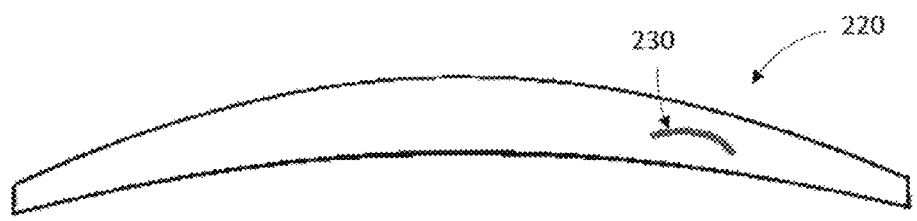
FIG. 3C illustrates the two sectional lens of FIG. 3A with a thin film coating the shaped feature and the first portion secured to the second portion.

FIG. 3C discloses the two sectional lens 200 of FIG. 2 with a thin film 230 coating the shaped feature 228 and the first portion 222 secured to the second portion 224. The first portion 222 and second portion 224 may be bonded together using an optical matching cement. After bonding, the first portion 222 and second portion 224 are substantially optically equivalent to one another and the thin film 230 is essentially embedded in the bulk of the two section lens 210. The optical design of the AR system is such that the contour and orientation of the embedded thin film 230 cause the reflector to redirect the image carrying light from the projector into the eye of the user. The shaped feature 228 is positioned and shaped such that light from the projector 108 is directed towards the eye of the user.

The advantage of the disclosed approach is that the shape of the shaped feature 228 can he quite complex. It can serve to shape the projected image in a wide range of ways and yet not meaningfully interfere with the user's view of the environment. Also, because the thin film 230 is reflective only in a limited portion of the visible spectrum and most of the light from the environment will be transmitted to the user's eye without attenuation.

Some of the complexity that can be included in the AR optical system by varying the shape of the shaped feature 228 and thin film 230 include magnification and distortion. For example, shaped feature 228 can be made with a "Fresnel-lens-like" step structure should it be necessary to fit the shape feature 228 within the bulk of the lens form. One of skill in the art would appreciate the various optical properties that may be imparted by the various shapes of the shaped feature 228. While the shaped feature 228 may be molded, other known methods for forming the feature 228 may be used including affixing the shaped feature 228 to the surface of the second portion 224.

Figure 4:
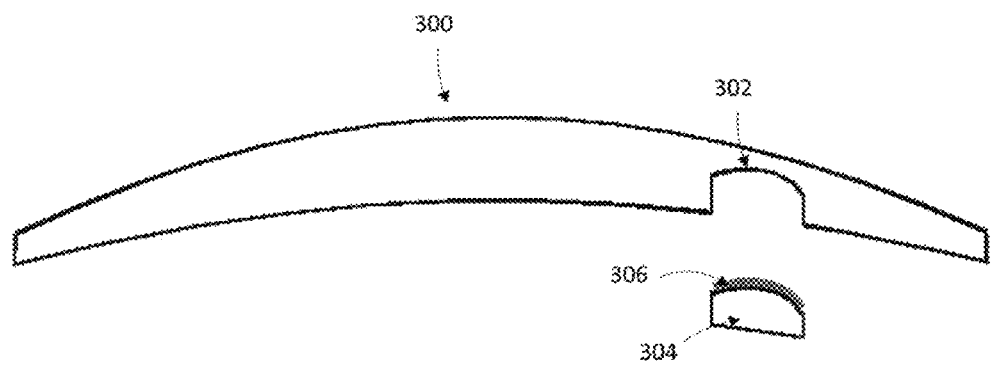
FIG. 4 depicts another embodiment of a lens.
Figure 5:
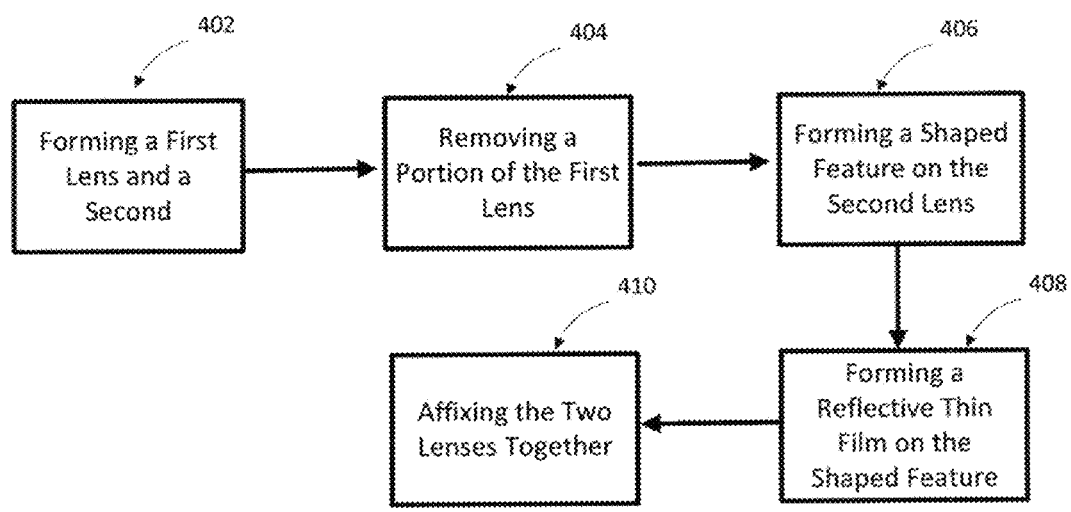
FIG. 5 depicts a schematic representation of a method of manufacturing an AR lens.

FIG. 4 depicts another embodiment of a lens. The lens 300 includes a recess 302. A plug unit 304 is shaped such that the recess 302 accommodates the plug unit 304 when the plug unit 304 is inserted into the recess 302 to form a single lens. A reflective thin film 306 is formed on the surface of the plug unit 304 facing the lens :300 when the plug unit 304 is inserted into the recess 302. The plug unit 304 may be optically bonded to the lens.

In one embodiment the emission of the projector 108, rather than being restricted to one narrow wavelength band and the plug unit 304 and thin film 302 being restricted to a single corresponding narrow wavelength band, the system may utilize multiple narrow wavelength bands. As an illustrative example the projector may emit narrow wavelengths in the red, green and blue and the plug unit 304 may include multiple thin films that each reflect a corresponding red, green or blue portion of the spectrum. In this way, it becomes possible to produce images in color. Consistent with this embodiment, one reflective thin film may reflect light in the range of 620-750 nm, a second reflective thin film may reflect light in the range of 450-495 nm, and a third reflective thin film may reflect light in the range of 495-570 nm.

FIG. 4 depicts a schematic representation of a representative method forming a lens with a shaped feature according to principles of the present invention. In step 402, two lenses are formed with a first lens having a convex shaped side that accommodates a concave side of a second lens. In step 404, a portion of the first lens is removed to farm a recess. The portion may be removed by any known method of creating a recess in a lens including grinding, cutting, etching, boring or any other method. In step 406, a shaped portion is formed on an area of the second lens with the shaped portion being formed on the second lens such that the shaped portion engages the recess when the two lenses are pressed together. The shaped portion may be farmed using any known method of forming a shape on a lens including adhering the shaped portion to the lens surface using an adhesive, layering the shaped portion on the lens or any other method for forming a shaped portion on a lens. In step 408, a reflective thin film is applied to the shaped portion. In one embodiment, a single reflective thin film is applied to the shaped portion to coat the surface of the shaped portion, in another embodiment, multiple thin films are applied, to the surface of the shaped portion with each thin film reflecting a different wavelength of light. Consistent with this embodiment, one reflective thin film may reflect light in the range of 620-750 nm, a second reflective thin film may reflect light in the range of 450-495 nm, and a third reflective thin film may reflect light in the range of 495-570 nm. In step 410, the two portions are affixed together using an optical cement. In step 410, the first lens and second lens are affixed together using an optical cement.

In another embodiment, the first and second lenses may he farmed by molding each lens to have a complementary construction so as to be affixed together with a reflective thin film therebetween according to the principals of the present invention.

Figure 6:
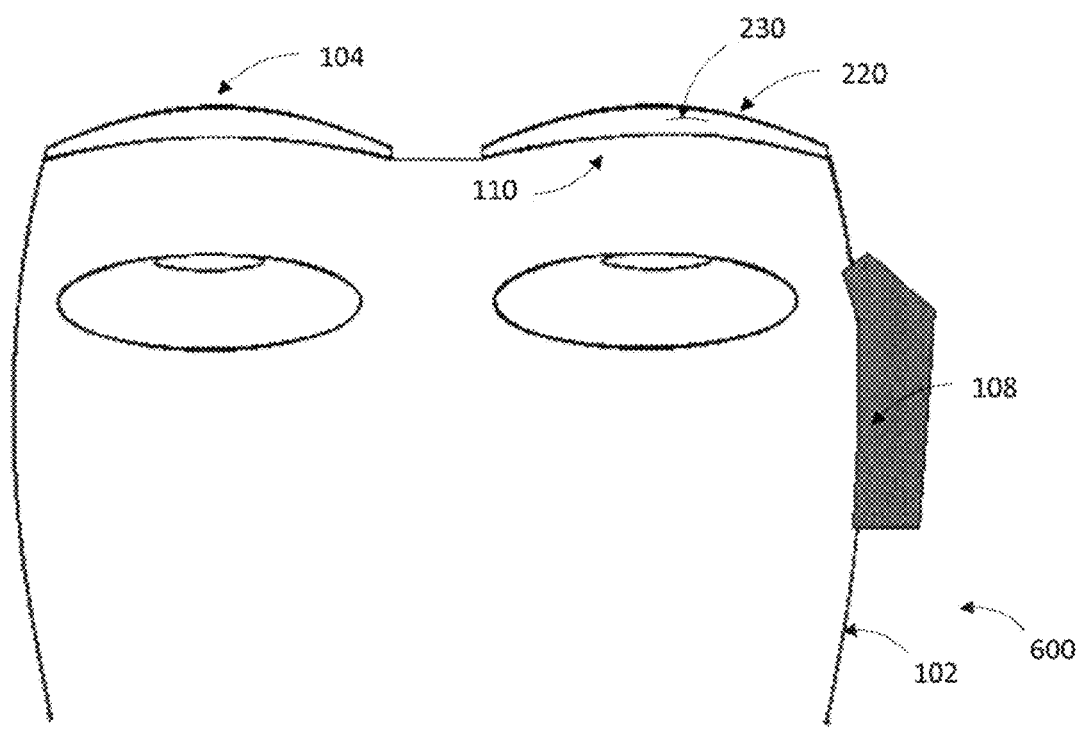
FIG. 6 depicts a top of an augmented reality display system including a lens according to the present invention.

FIG. 6 depicts a top of an augmented reality display system including a component lens. The glasses 600 include the frame 102, the left lens 104, the right lens 220 and the projector 108 affixed to the frame 102 on the side of the frame 102 closest the right lens 220. The shaped feature 228 and thin film 230 are incorporated into the lens 220. As one having ordinary skill in the art would recognize, by incorporating the shaped feature 228 and thin film 230 into the lens 220, a user's view through the lens 220 is not obstructed. As one of skill in the art would readily appreciate, the shaped feature according to principles of the present invention may be incorporated into the left lens, as long as the glasses type AR system is designed to project images to the left lens. Further, it may be similarly contemplated that both the left and right lens incorporate the shaped feature according to principles of the present invention.

Having thus described in detail at least one embodiment of the present invention, it is to be understood that the invention defined by the above paragraphs is not to be limited to particular details set forth in the above description as many apparent variations thereof are possible without departing from the spirit or scope of the present invention.

While various embodiments of the present invention have been described above, it should be understood that they have been presented by way of example only, and not limitation. It will be apparent to persons skilled in the relevant art that various changes in form and detail can be made therein without departing from the spirit and scope of the present invention. Persons of ordinary skill in the art will understand that a wide variety of suitable supporting structures and patterns can be readily formed. Any number of longitudinal stiffening ribs or circular ribs could be provided. Thus, the breadth and scope of the present invention should not be limited by any of the above-described exemplary embodiments, but should be defined only in accordance with the following claims and their equivalents.

What is claimed is:

1. A lens including:
    a first portion having a recess of a defined shape;
    a second portion having a shaped feature shaped such that the recess accommodates the shaped feature when the first portion is adhered to the second portion:
    a reflective layer on a surface of the shaped feature between the first portion and the second portion; and
    wherein the reflective layer comprises a plurality of reflective thin films with each of said plurality of reflective thin films configured to reflect a different portion of the visible spectrum of light.

2. The lens of claim 1, wherein the reflective layer reflects a portion of the visible spectrum.

3. The lens of claim 1, wherein the first portion is sealed to the second portion using an optical cement.

4. The lens of claim 1, wherein the shaped feature is shaped such that light projected onto the reflective layer is reflected to a predetermined point outside the lens.

5. The lens of claim 1, wherein the first portion is substantially concave and the second portion is substantially convex.

6. The lens of claim 1, wherein at least one of the reflective thin films reflects light in the range of 620-750 nm.

7. The lens of claim 1, wherein at least one of the reflective thin films reflects light in the range of 450-495 nm.

8. The lens of claim 1, wherein at least one of the reflective thin films reflects light in the range of 495-570 nm.

9. A pair of augmented reality glasses including:
    a frame;
    a lens in the frame, the lens including
        a first portion having a recess of a defined shape;
        a second portion having a shaped feature shaped such that the recess accommodates the shaped feature when the first portion abuts the second portion; and
        a reflective layer on a surface of the shaped feature;
    a projector affixed to the frame near the lens; and
    wherein the reflective layer comprises a plurality of reflective thin films each of said plurality of reflective thin films configured to reflect a different portion of the visible spectrum of light.

10. The glasses of claim 9, wherein the reflective layer reflects a portion of the visible spectrum.

11. The glasses of claim 9, wherein the first portion is sealed to the second portion using an optical cement.

12. The glasses of claim 9, wherein the shaped feature is shaped such that light projected onto the reflective layer is reflected to a predetermined point outside the lens.

13. The glasses of claim 9, wherein the first portion is substantially concave and the second portion is substantially convex.

14. The glasses of claim 9, wherein at least one of the reflective thin films reflects light in the range of 620-750 nm.

15. The glasses of claim 9, wherein at least one of the reflective thin films reflects light in the range of 450-495 nm.

16. The glasses of claim 9, wherein at least one of the reflective thin films reflects light in the range of 495-570 nm.

17. A method of forming a lens including the steps of:
    forming a first portion;
    forming a recess having a defined shape in the first portion;
    forming a second portion;
    forming a shaped feature corresponding to the recess on the first portion on a surface of the surface of the second portion; and
    forming a reflective thin film on the surface of the shaped feature; and
    wherein the coating step includes the step of coating the shaped feature with a plurality of reflective thin films with each reflective thin film configured to reflect a different portion of the visible spectrum of light.

18. The method of claim 17, wherein the reflective thin film reflects a portion of the visible spectrum.

19. The method of claim 17, including the step of sealing the first portion to the second portion using an optical cement.

20. The method of claim 17, including the step of shaping the shaped feature such that light projected onto the reflective thin film is reflected to a predetermined point outside the lens.

21. The method of claim 17, wherein the first portion is substantially concave and the second portion is substantially convex.

22. The method of claim 17, wherein at least one of the reflective thin films reflects light in the range of 620-750 nm.

23. The method of claim 17, wherein at least one of the reflective thin films reflects light in the range of 450-495 nm.

24. The method of claim 17, wherein at least one of the reflective thin films reflects light in the range of 495-570 nm.

* * * * *